Patented June 29, 1926.

UNITED STATES PATENT OFFICE.

ERNEST JOSEPH LUSH, OF LONDON, ENGLAND, ASSIGNOR TO TECHNICAL RESEARCH WORKS LIMITED, OF LONDON, ENGLAND.

PRODUCTION OF METALLIC CATALYSTS.

No Drawing. Application filed May 11, 1925, Serial No. 29,617, and in Great Britain July 16, 1924.

This invention relates to improvements in the method of activating and reactivating metallic catalysts by subjecting the surfaces of the metal forming the base to an electrolytic anodic oxidation in an electrolytic bath using as electrolyte a salt which will not allow the metal to pass into solution with the result that on passage of the electric current an active precipitate is coated over the metal which is subsequently washed, dried and reduced in hydrogen whereby a very active form of catalyst is produced. The present invention has particular reference to the preparation or production of a catalyst or catalysts suitable for use in the manufacture of synthetic ammonia or products used therein, for example, hydrogen or other purposes.

It is well known that in the manufacture of catalysts for use in catalytic reactions e. g. the manufacture of synthetic ammonia, or hydrogen comparatively large pieces of iron oxide or other ore serve the purpose of the catalytic mass used in the process, and the object of the present invention is to produce a catalytic mass of higher efficiency for the purpose so that less room is occupied for a given production.

I have found that when a metal, for example, iron, in the form of turnings, plates or ribbon-like products is subjected to surface oxidation as above described and treated in a similar manner a very active catalyst is produced suitable, for example, for the synthesis of ammonia from nitrogen and hydrogen mixtures or hydrogen from carbon monoxide and water vapour mixtures.

Further when an alloy of two or more metals is to be used as catalyst, for example, nickel and copper in the hydrogenation of oils or dehydrogenation of alcohols or other purposes for which catalysts are used, the above described process of catalyst manufacture is especially applicable since the composition of the surface which has been oxidized and reduced very closely approximates to that of the unoxidized alloy, and therefore on reduction a catalyst is produced containing the metals of the original alloy very intimately mixed, and in approximately the same proportions.

When it is desired to produce a cataylst consisting of a metal with a non-reducible oxide such as the alkalies, the latter acting as promoters in the known manner, the procedure is the same as set out above except that as electrolyte is used a solution of a suitable salt of the promoter. For example a catalyst for the synthesis of ammonia may be made from iron turnings oxidized anodically in an electrolytic bath containing potassium carbonate or hydroxide in solution. In this latter case the alkali salt remaining on the turnings after removal from the bath is not removed by washing but the catalyst is reduced by hydrogen in the known manner.

Moreover since the catalyst is readily reactivated without loss of electrolyte, use can be made of the rare alkalies more economically than heretofore.

What I claim is:—

1. The method of activating metallic surfaces and restoring such activity in spent catalysts, which consists in subjecting the metallic surfaces to an electrolytical anodic oxidation using as the electrolyte an aqueous solution of a salt of an alkali metal, which salt will not allow the metal of said surfaces to pass into solution, whereby the metal on oxidation contains the adsorbed salt in intimate contact therewith, and afterwards reducing in hydrogen.

2. The method of activating metallic surfaces and restoring such activity in spent catalysts, which consists in subjecting iron turnings to an electrolytical anodic oxidation using as the electrolyte an aqueous solution of potassium carbonate, and afterwards reducing the oxidized surfaces of the turnings in hydrogen, whereby a very active catalyst is produced.

In testimony whereof I affix my signature.

ERNEST JOSEPH LUSH.